(12) United States Patent
Rukonic et al.

(10) Patent No.: US 10,332,080 B1
(45) Date of Patent: Jun. 25, 2019

(54) SYSTEM AND METHOD FOR AUTOMATED OPTIMIZATION OF BUDGETED FUND ALLOCATION TO PAY BILLS

(71) Applicant: Intuit Inc., Mountain View, CA (US)

(72) Inventors: Marko Rukonic, San Jose, CA (US); Hui Jin, Saratoga, CA (US); Naren Sulur, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1132 days.

(21) Appl. No.: 14/338,457

(22) Filed: Jul. 23, 2014

(51) Int. Cl.
*G06Q 20/10* (2012.01)
*G06Q 20/22* (2012.01)
*G06Q 40/00* (2012.01)

(52) U.S. Cl.
CPC ........... *G06Q 20/102* (2013.01); *G06Q 20/22* (2013.01)

(58) Field of Classification Search
USPC .......................................................... 705/35
See application file for complete search history.

(56) References Cited

U.S. PATENT DOCUMENTS

| | | | | | |
|---|---|---|---|---|---|
| 2,341,327 | A * | 2/1944 | Lyndes | ................... | A45C 11/24 150/117 |
| 5,963,925 | A * | 10/1999 | Kolling | ................... | G06Q 20/00 705/26.1 |
| 6,128,603 | A * | 10/2000 | Dent | ...................... | G06Q 20/04 705/33 |
| 8,032,456 | B1* | 10/2011 | Bent | ..................... | G06Q 20/102 235/379 |
| 8,073,759 | B1* | 12/2011 | Del Favero | ........ | G06Q 10/0631 705/36 R |
| 8,239,298 | B1* | 8/2012 | Wilson | .................. | G06Q 40/00 705/35 |
| 8,260,705 | B1* | 9/2012 | Bent | ....................... | G06Q 40/06 235/379 |
| 2001/0023414 | A1* | 9/2001 | Kumar | .................... | G06F 21/41 705/35 |
| 2001/0032182 | A1* | 10/2001 | Kumar | .................... | G06F 21/41 705/40 |
| 2004/0088253 | A1* | 5/2004 | Crispyn | ............... | G06Q 20/102 705/40 |
| 2008/0249848 | A1* | 10/2008 | Kay | ....................... | G06Q 20/14 705/14.25 |

(Continued)

OTHER PUBLICATIONS

GE Miller (2013) "How to get out of Debt: Step 2—Debt Payoff Strategy" https://20somethingfinance.com/how-to-get-out-of-debt-step-2-debt-payoff-strategy/.*

*Primary Examiner* — Asha Puttaiah
(74) *Attorney, Agent, or Firm* — Hawley Troxell Ennis & Hawley LLP; Philip McKay

(57) ABSTRACT

A system and method for automated optimization of budgeted fund allocation to pay bills receives financial data including billing and income data. The data is ordered according to dates and amounts and the processed to determine payments to be made at certain dates, in order to ensure that minimum payments are satisfied. Amounts over the minimum owed for certain bills are paid when possible, in order to minimize future debt load. Amounts owed are paid, when warranted, in two or more portions on different dates separated by an income event. Payments made and overall financial status is reported to a consumer computing system associated with a consumer.

27 Claims, 5 Drawing Sheets

(56) References Cited

U.S. PATENT DOCUMENTS

| | | | | |
|---|---|---|---|---|
| 2009/0070241 A1* | 3/2009 | Manohar | ............... | G06Q 10/06 |
| | | | | 705/30 |
| 2009/0119190 A1* | 5/2009 | Realini | ................. | G06Q 20/04 |
| | | | | 705/30 |
| 2009/0240605 A1* | 9/2009 | Rukonic | ................ | G06Q 20/10 |
| | | | | 705/30 |
| 2011/0295739 A1* | 12/2011 | Rice | ...................... | G06Q 20/10 |
| | | | | 705/39 |

* cited by examiner

SYSTEM AND METHOD FOR AUTOMATED OPTIMIZATION OF BUDGETED FUND ALLOCATION TO PAY BILLS

BACKGROUND

In everyday life, people purchase goods and/or services that they need in order to maintain or increase their quality of life, to affect their happiness, accomplish goals, and for many other reasons. Some of those goods and/or services include such things as food, electricity service, water service, a garbage pickup service, rent or a mortgage associated with a home, and many other goods and/or services. For each of these goods and/or services, a consumer making the purchase will either pay for the goods and/or services at the time of purchase, or will receive an invoice or bill for the goods and/or services at a later date. Occasionally, a purchase of goods and/or services will be a single, one-time purchase.

Some goods and/or services are purchased on an ongoing basis, such as gas for an automobile, electricity to power a home, regular deliveries of food, municipal water service, cell phone or other telephone related service, Internet service, or any other goods and/or services a consumer purchases on an ongoing basis. Often, regularly purchased goods and/or services are invoiced periodically, and payment is made by the consumer accordingly. Goods and/or services may also be purchased using a revolving credit account, such as a credit card account or other revolving credit account, which is billed regularly, such as weekly, monthly, quarterly, or annually.

It is not uncommon for a person to have more than one credit card, a rent or mortgage bill, an electric utility bill, a phone bill, and many other bills to pay on a regular basis, such as on a monthly basis. Even when payments on various bills are due over the same period, such as monthly, those payments will often have different due dates. For example, a mortgage or rent payment may be due on the $1^{st}$, $5^{th}$, $10^{th}$, or any other day of each month, and payments on various credit card bills may be due, for example, on the $5^{th}$, $7^{th}$, $17^{th}$ and the $19^{th}$ of the month, or any other day of each month, depending on a wide variety of factors. Payments on other bills such as internet service, water and/or electric service, and garbage pickup service may be due on any previously mentioned dates, or on other dates.

It is not uncommon for a person to have more than one income pay date within a given period, such as within a given month. Some people are paid once a month, while others are paid twice a month, such as on the $1^{st}$ day and $15^{th}$ day of the month, while still others are paid weekly, such as every Friday, or biweekly, such as every other Friday. In other situations, such as when a contractor is working for one or more clients, income pay dates for the contractor may be at least partly determined by when the clients pay the contractor, and income pay dates for the contractor may thus vary substantially, with one or more pay dates occasionally being more than a month apart.

With the numbers of bills that households have, and the number of times income amounts are paid into the household, when there is not enough income being received to pay each debt in full each month, determining which bills to pay, an amount to pay, and a date to pay them is a complex task which is often beyond the skills of the person needing to make the payment.

For example, a person being paid biweekly receives an average of just over two paychecks each month, and receives three paychecks in each of two of the months of the year, approximately six months apart. Thus, income is received, in such circumstances, at varying dates during different months. However, regardless of when income amounts are received for a given month, bills are each typically due on fixed dates and thus will typically be due on the same dates each month. Because the dates that income amounts arrive will vary over each month, budgeting becomes a rather complex process.

In some situations, computing system solutions have been employed which help a consumer pay bills. Typical computing solutions include processes which receive user input directing certain payments to be made at certain dates, and alerting the user when a payment would cause a budget to be overrun. However, these typical computing solutions are technically inefficient because the computing processes are typically designed for use by a single user, and those computing processes have to wait for user decision input in many cases in order to proceed with bill payment.

Therefore, it would be beneficial to have an automated system and method for analyzing income and expenses, resulting in automated optimization of budgeted fund allocation to pay bills. It would be further beneficial to have a multi-user system that can operate on billing data of many users.

SUMMARY

In one embodiment, a system and method for automated optimization of budgeted fund allocation to pay bills includes a process whereby financial data of a consumer is received at a first computing system from one or more financial data sources, such as from a consumer providing their own financial data, a banking or other financial institution computing system providing financial data of the consumer, one or more billing entities providing electronic or paper bills to the consumer, or from any other financial data source. In one embodiment, financial data of two or more consumers is received from two or more financial data sources.

In one embodiment, a billing entity is any business, company, person or other entity that is owed money directly or indirectly by a consumer, for past purchases of good and/or services, for payments being made in advance for goods and/or services yet to be delivered to the consumer, or for any other reason. In one embodiment, a billing entity is any business, company, person or other entity collecting money on behalf of another business, company, person or other entity. In one embodiment, the billing entity is a credit card company or other entity that has issued a revolving credit line or installment loan to a consumer, including mortgage companies and others. In one embodiment, the received financial data includes electronic data received from two or more billing entities, and represents billing data and/or income related data for a first time period, such as a week, two weeks, a month, a quarter, a half-year, a year, or any other time period appropriate for bill payment processing.

In one embodiment, the received financial data includes at least two billing-related line items representing amounts owed to at least two different billing entities. In one embodiment, the financial data includes at least one income-related line item having a real income amount previously received or an expected income amount expected to be received at a later date.

In one embodiment, each billing-related line item represents one or more typical data items a consumer would normally see on an invoice or other bill, such as one or more of a total payment amount owed to the billing entity, a payment due date, a minimum payment amount, billing entity contact data, and any other billing-related data typically found on an invoice or other bill.

In one embodiment, running balance data is received, the running balance including an initial running balance amount indicating how much money is budgeted or otherwise currently available for making payments.

In one embodiment, the initial running balance amount is a hypothetical amount expected to be available on a given income date or another date for making payments. In one embodiment, the initial running balance amount is an actual balance amount associated with a designated financial institution account. In one embodiment, the initial running balance amount is a sum of two or more actual and/or hypothetical balance amounts associated with two or more respective financial institution accounts having funds that are currently or will later be made available for making payments. In one embodiment, the initial running balance amount is zero or below zero, representing a lack of funds being available on a given date for the payment of bills.

In one embodiment, the running balance amount is increased, according to the actual receipt date or according to an anticipated receipt date, for received income amounts that are designated as either being made immediately available for making payments or which will become available at a later known date, and is decreased for each payment made, according to the payment date or other associated date. In one embodiment, an income amount includes a portion of a total net amount received in a given paycheck or other pay event, with the remaining portion of the total net amount received being allocated for a purpose other than bill payment, such as saving, retirement, or other purpose. In one embodiment, income includes any amount of money that is made available for the payment of bills regardless of source. Therefore, in one embodiment, income includes gifts, inheritances, lottery winnings and any other money that is made available for the payment of bills.

In one embodiment, a payment date is a date when a payment amount is expected to be removed from the running balance amount, due to a payment being cashed by a billing entity, a guaranteed check being issued, or for any other reason. In one embodiment, a payment is made on a first date and a payment amount associated with the payment is subtracted from the running balance amount on a later second date when the payment is either expected to be received by a billing entity or when the payment is actually received and cashed by a billing entity associated with the payment. In one embodiment, a payment date is one of either the first date when the payment is sent to a billing entity or their authorized representative, or a second date when the payment is cashed by the billing entity or their authorized representative.

In one embodiment, a first pass is performed in order to determine one or more of a lowest running balance amounts, holdback amounts, and leftover funds amounts that would result from paying at least the minimum amount on each payment-related line item over a predetermined period of time. While the first pass is performed, during which no actual payments are made, as each minimum payment amount is considered, the minimum payment amount is added to a total of minimum payments, in order to have an understanding at any given time how much money may need to be held back from other payments, in order to make sure a minimum payment is made on each revolving credit account. If the running balance goes below zero, that total minimum payment amount is stored when a next income-related line item is processed, for later use as a holdback amount.

As the first pass proceeds, a running balance amount is a current amount remaining after previously processed minimum payment amounts have been subtracted and any income amounts added.

In one embodiment, the line items of the financial data are ordered by effective date and amount. In one embodiment, an effective date of a bill payment is the due date. In one embodiment, an effective date of an income amount is a date the income amount is expected to be made available for bill payment processing. In one embodiment, the line items of the financial data having equivalent effective dates are ordered as a group beginning with any income related line items followed by any bill payment related line items.

In one embodiment, data is stored each time a processing period begins and whenever the running balance transitions from a negative balance amount to a positive balance amount, and/or whenever the running balance transitions from a positive balance amount to a negative balance amount.

In one embodiment, each line item is processed in succession according to its effective date. In one embodiment, if the line item currently being processed is a payment related line item, the running balance is decreased by a minimum payment amount, if any, associated with the current line item, and a running total amount of minimum payments is increased by the minimum payment amount. In one embodiment, when processing a payment amount, if the decreased running balance is below zero, the running total amount of minimum payments is copied to a holdback amount and associated with the effective date of the line item currently being processed. This holdback amount will be used in later processing. In one embodiment, if the later line item processing pushes the running balance further below zero, i.e. more negative, this new decreased running balance is copied to the holdback amount, replacing the previous amount stored there, and the effective date of the line item that pushed the running balance further below zero is then associated with the new holdback amount.

In one embodiment, if an income related line item causes the running balance to transition from a negative running balance amount to a positive running balance amount, the value of the holdback amount and the associated date are stored for later processing, and the value of the holdback amount is then reset to zero and the associated date is either ignored or deleted.

In one embodiment, once each financial data line item has been processed in the first pass, notice is taken of the lowest minimum balance achieved during the first pass. In one embodiment, the lowest minimum balance achieved during the first pass will be a minimum balance achieved through the processing of a payment line item immediately prior to the processing of an income related line item.

In one embodiment, once each financial data line item has been processed in the first pass, notice is taken of whether the running balance is above zero. If so, in one embodiment, the running balance amount at the end of the first pass is stored in an extra amount available variable which represents funds available for paying additional amounts against one or more line items.

In one embodiment, at any time when the running balance is below zero, a queue is generated including each payment related line item in succession until the running balance is increased above zero, typically through the processing of an income related line item.

In one embodiment, once first pass processing of each line item has taken place, a second pass through each line item is made, again in order by the effective date of each line item.

In this second pass, in one embodiment, an actual payment amount will be determined for each payment related line item. In one embodiment, actual payments will be issued to the billing entities or their representatives, represented by each payment related line item.

In one embodiment, actual payment amounts are determined using different criteria for different types of bills. For example, and in one embodiment, for line items representing bills where the minimum amount due is equivalent to the entire amount due, the amount paid against that particular line item will be the minimum of either the amount owed on the bill or the difference between the running balance and a holdback amount applicable to the particular time period associated with the line item. If the amount paid according to the criteria above is less than the minimum amount due, any remaining amount is added to a queue as a new line item together with any other information regarding the line item needed to make a remainder payment when new income is realized through an income related event.

In another example, and in one embodiment, for line items representing bills where the minimum amount due is different than the entire amount due, the amount paid against that line item will be the minimum payment amount required by the line item with an additional optional amount paid equivalent to the minimum of either the lowest minimum balance achieved during the first pass or the difference between the total balance due on the line item and the minimum payment amount already identified for payment. In one embodiment, if the lowest minimum balance achieved during the first pass is below zero, no additional amount will be paid against this line item. In one embodiment, if the lowest minimum balance achieved during the first pass is zero or above zero, then the lowest minimum balance amount is reduced by the minimum of the minimum balance amount and any additional amount paid. In one embodiment, additional amounts paid are any amount from zero up to the difference between the total balance due on the line item and the minimum payment amount already identified for payment. If the adjusted minimum balance amount ever drops to zero or below, no additional payment is made and the adjusted minimum balance is reset to be equivalent to the running balance amount resulting at the end of the first pass.

Following completion of the second pass, if the determined payment amounts and any additional amounts have not yet been issued as actual payments to the respective billing entities or their representatives, payments are issued to one or more of the billing entities, as determined in either of the first pass or the second pass.

In one embodiment, the process operations described herein are performed on financial data received from, by, or on behalf of many consumers to efficiently determine various bill payment amounts to be made.

Through the process for automated optimization of budgeted fund allocation to pay bills outlined above, analysis of financial data for thousands of consumers may take place quickly and efficiently without user intervention.

Figure 1:
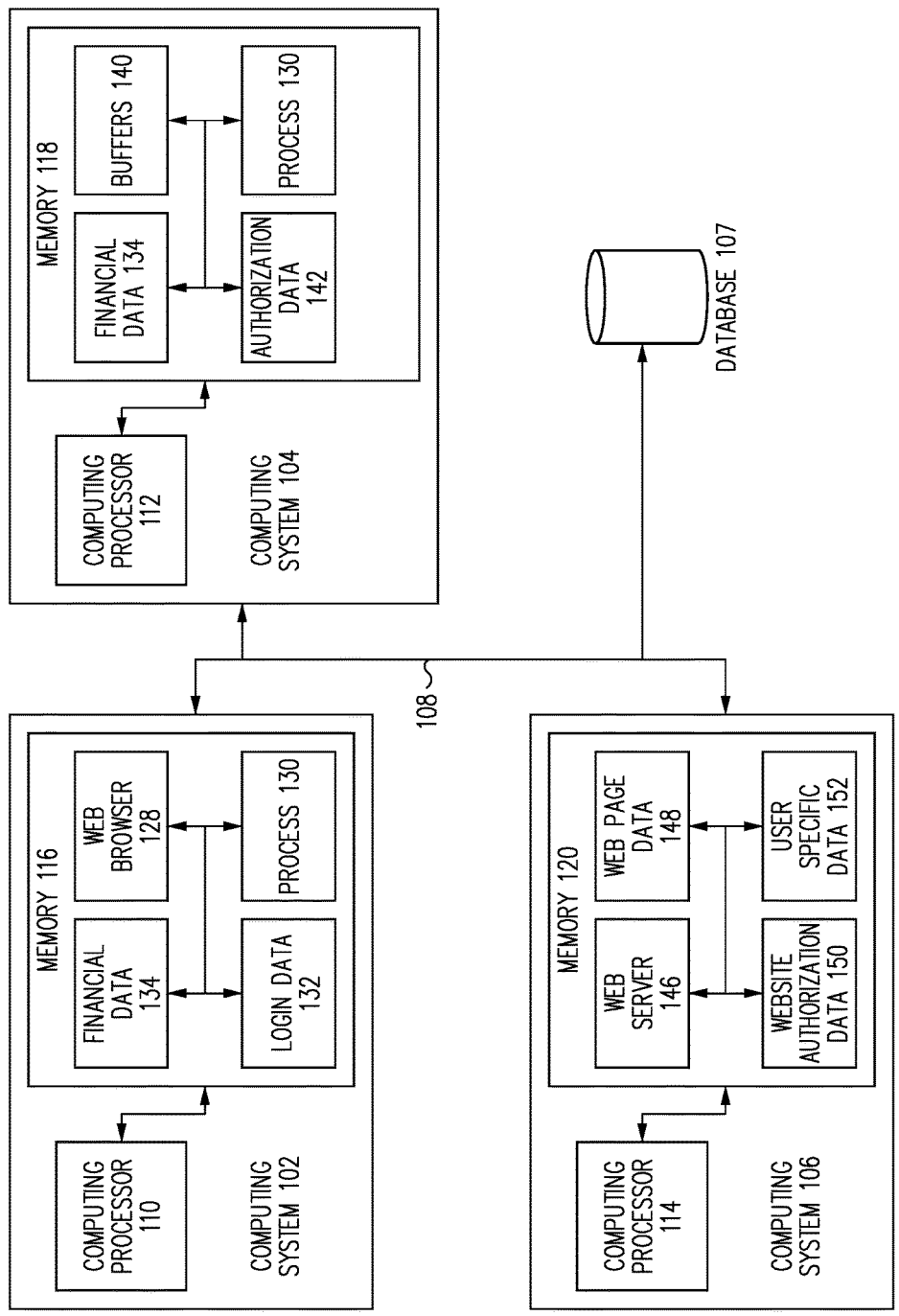
FIG. 1 is a functional block diagram showing the interaction of various elements for implementing one embodiment of a system and method for automated optimization of budgeted fund allocation to pay bills.
Figure 2A:
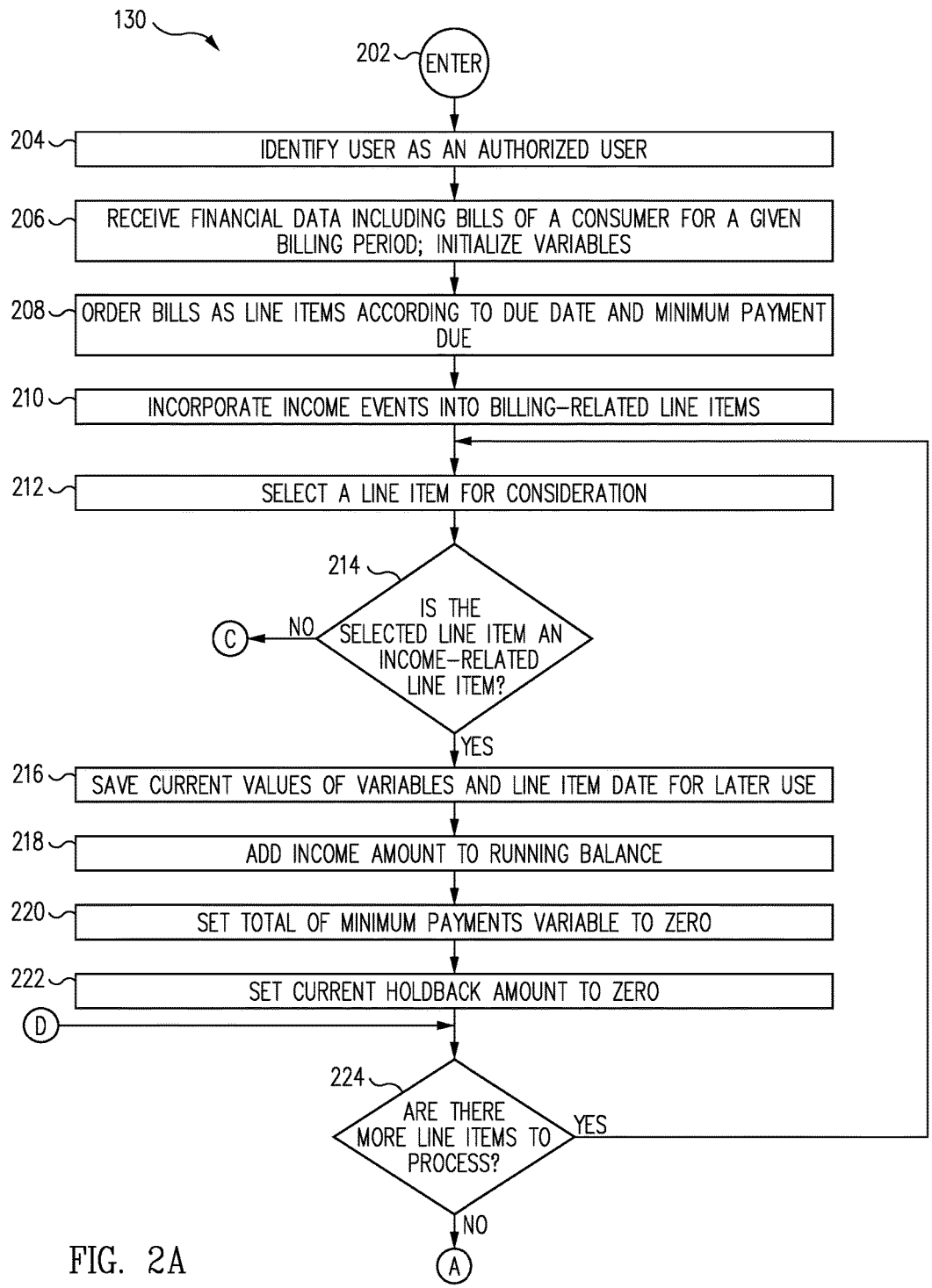
FIG. 2 includes FIGS. 2A, 2B, 2C, and 2D and is an exemplary flowchart depicting a process for automated optimization of budgeted fund allocation to pay bills in accordance with one embodiment.
Figure 2B:
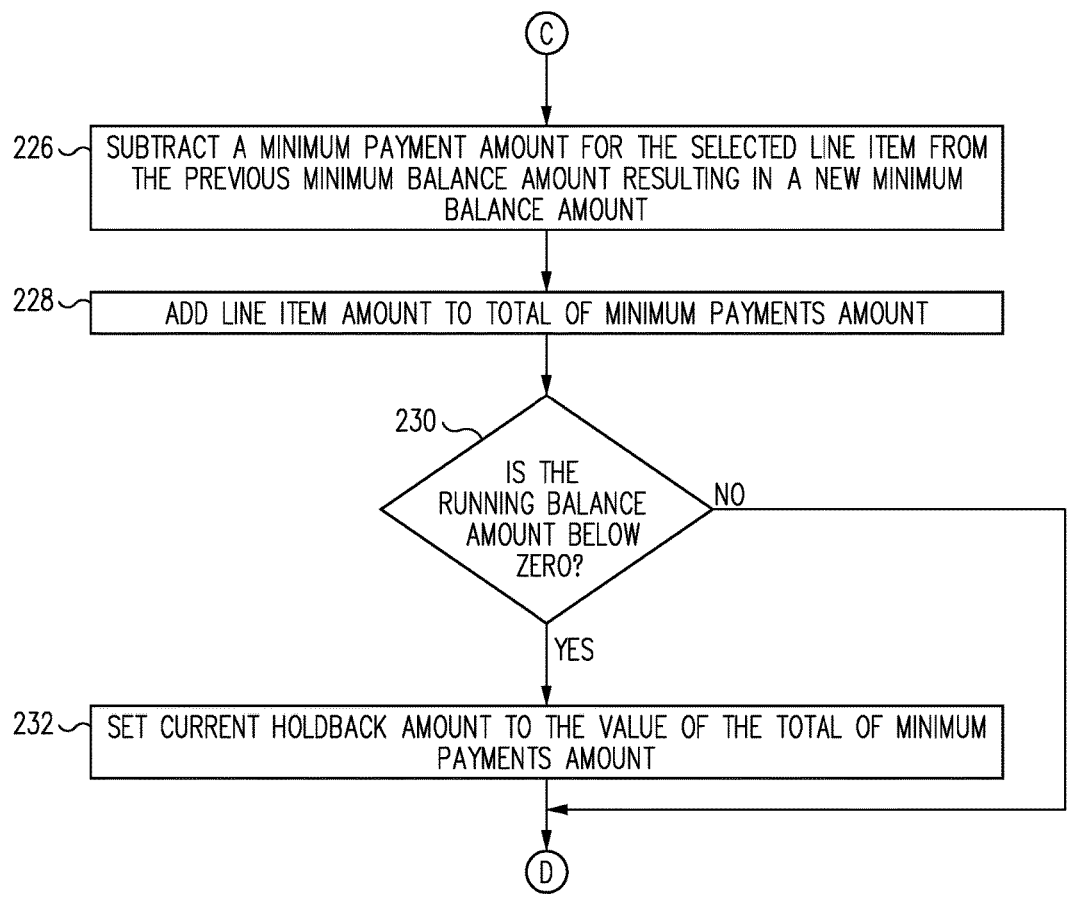
Figure 2C:
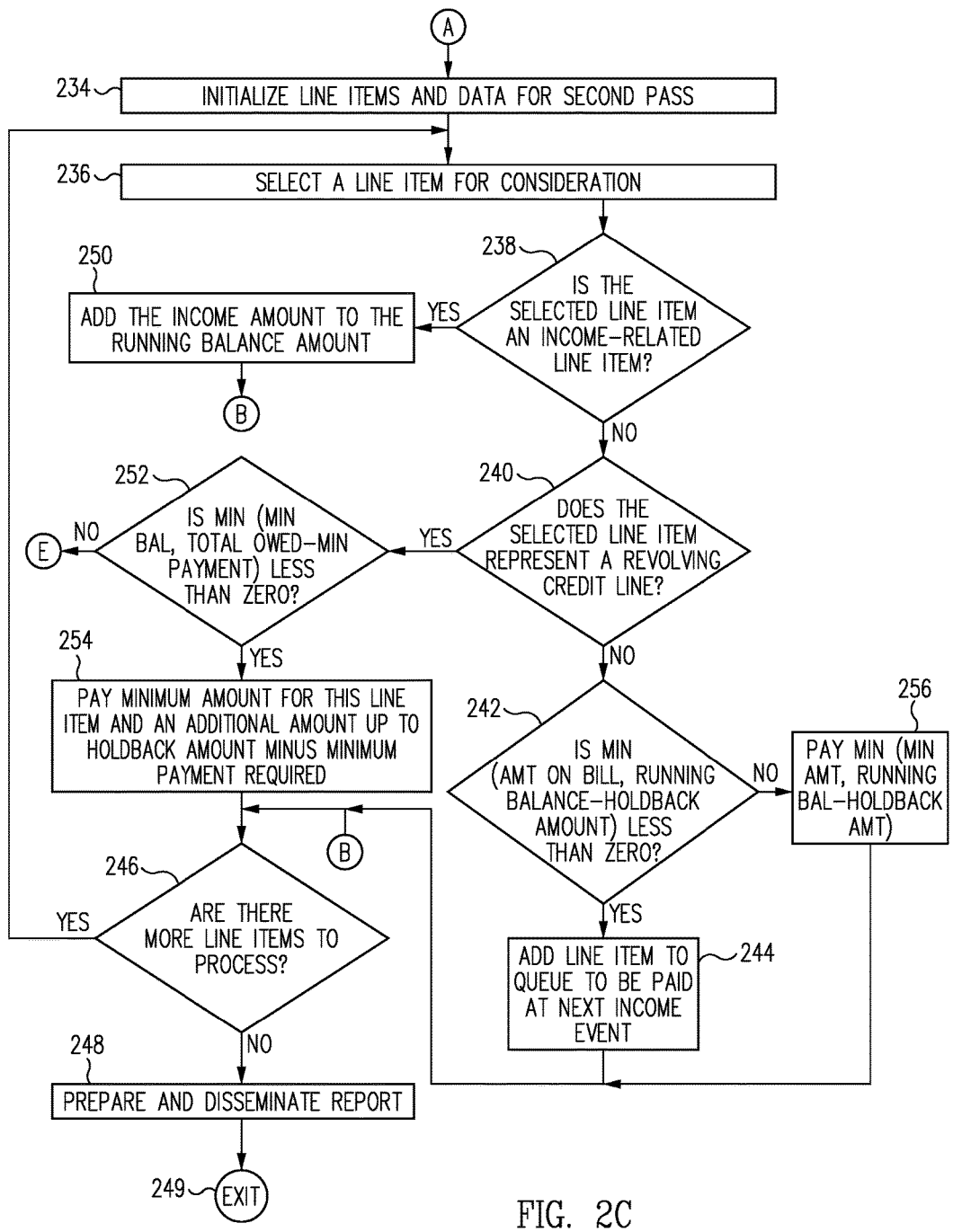
Figure 2D:
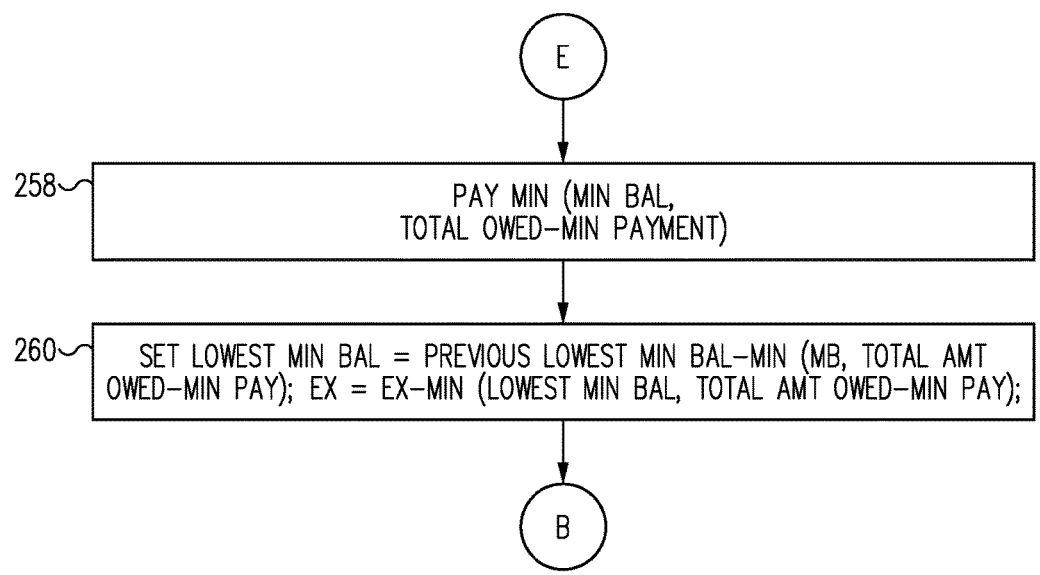

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

In one embodiment, financial data including billing and income data of one or more consumers are analyzed by a financial management system to efficiently determine one or more bill payment amounts which satisfy at least the minimum payment of all bills and/or invoices represented in the financial data. Additional amounts are paid, if sufficient funds are available for the additional amounts. Line items representing bills are analyzed to determine a minimum payment required, an effective date, such as a date due, and a total amount owed, and line items are ordered based on date due and minimum payment amount. Line items representing income payment events are also analyzed to determine one or more amounts associated with the income event, and an effective date when the income amount is expected to be paid.

A first review of each line item is made in succession beginning with line items having earlier dates, followed by line items having later dates, to determine a minimum balance that will result from paying at least the minimum amounts against each billing-related line item. For income-related line items, income payment amounts are added to a running balance associated with making the payments. In certain circumstances, one or more holdback amounts are determined for one or more time periods, the time periods being periods bounded by one or more dates of line items representing receipt of income amounts.

In a second review of each line item, actual payment amounts are determined based on the minimum balance of the first pass, the holdback amounts, and/or any available funds expected to be available once all payment amounts of billing-related line items have been paid.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a system and method for automated optimization of budgeted fund allocation to pay bills includes a process for system and method for automated optimization of budgeted fund allocation to pay bills, implemented by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for automated optimization of budgeted fund allocation to pay bills are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems.

In one embodiment, two or more computing systems, and/or two or more computing environments, are connected by one or more communications channels or networks, and/or distributed computing system networks, such as, but not limited to: a public cloud; a private cloud; a virtual private cloud (VPC); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" and the term "communication channel" include, but are not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional block diagram showing the interaction of various elements for implementing one embodiment of a system and method for automated optimization of budgeted fund allocation to pay bills.

Referring to FIG. 1, exemplary system 100 includes computing system 102, computing system 104, computing system 106, and database 107, each of which are operatively coupled through communications channel 108.

Of particular note, the various elements in FIG. 1 are shown for illustrative purposes as being associated with specific computing systems, such as computing system 102, computing system 104, and computing system 106. However, the exemplary placement of the various elements within system 100 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, one or more cloud computing environments, one or more third party service capabilities, or any other computing environments or systems, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, a consumer or other user in control of the one or more computing systems, a financial institution representative, a party and/or entity providing all or a portion of a cloud-based computing environment, the owner or a billing entity of a service, and/or any other party and/or entity providing one or more functions, and/or any other party and/or entity as discussed herein, and/or as known in the art at the time of filing, and/or as made known after the time of filing.

Computing systems 102, 104, and 106 each have respective computing processors 110, 112, and 114, and associated respective memories 116, 118, and 120.

In one embodiment, memory 116 of computing system 102 includes one or more of web browser 128, process 130, login data 132 and financial data 134.

In practical application, computing system 102 is, in one embodiment, under the control of a consumer who engages with, or has previously engaged, a billing entity such as a credit card company, a mortgage company, an electric or water utility company, a cell phone billing entity, an internet company, or any other billing entity.

In one embodiment, a billing entity is any business, company, person or other entity, or that is owed money directly or indirectly by a consumer, for past purchases of good and/or services, or for payments being made in advance for goods and/or services yet to be delivered to the consumer. In one embodiment, a billing entity is any business, company, person or other entity collecting money on behalf of another business, company, person or other entity. In one embodiment, the billing entity is a credit card company or other entity that has issued a revolving credit line or installment loan to a consumer.

In one embodiment, memory 118 of computing system 104 includes one or more of process 130, buffers 140, financial data 134, and authorization data 142. Buffers 140 is a storage space for one or more process variables used in process 130, such as holdback amounts, one or more time period associated with each holdback amount, a total of minimum payments variable, and/or any other process variable described herein.

As seen in FIG. 1 depicting system 100, all of or portions of process 130 may be present, or not, at any given time, in any of computing system 102, computing system 104 as needed, based on the particular design of a particular implementation of system 100. Optionally, all of or portions of process 130 may be present, or not, at any given time, in computing system 106 (not shown) as well, based on the particular design of a particular implementation of system 100. Further, all of or portions of process 130 may be transferable between one or more computing systems, such as computing system 102 and computing system 104, for any reason, such as for efficiency reasons depending on where a particular process operation of process 130 is most efficiently performed.

Correspondingly, either all of or a portion of financial data 134 is present, in one embodiment, in either or both of computing system 102 and computing system 104. Further, all of or a portion of financial data stored on or used by computing system 104, such as financial data 134, may be provided, for example, by a consumer user of computing system 102.

In one embodiment, memory 120 of computing system 106 includes one or more of web server 146, web page data 148, website authorization data 150, and user-specific data 152. In one embodiment, web server 146 is configured to provide one or more webpages associated with one or more websites of a billing entity, such as a credit card company, a mortgage company, a utility company, a phone company, or any other business that a consumer may owe money to at any time. Upon proper authentication of a consumer user as determined by computing system 106, web server 146 utilizes user-specific data 152 to provide one or more user-specific webpages having billing information of the consumer, such as one or more amounts owed by the consumer to the billing entity, one or more due dates, a minimum payment amount, or any other information deemed useful by the billing entity.

Web browser 128 of computing system 102 is used, in one embodiment, by a consumer user of computing system 102 who, through user input to web browser 128, interacts with one or more process operations of computing system 104 and/or one or more webpages presented to the consumer user of computing system 102 by computing system 106.

Reference is made within this disclosure of, for example, process 130, financial data 134, login data 132, authorization data 142, web page data 148, website authorization data 150, buffer data of buffers 140 and user-specific data 152 being present on one or more of computing system 102, computing system 104, or computing system 106, any portion of process 130 and or any item of data or set of data may instead be stored within database 107 and retrieved by any computing system when necessary to perform one or more operations of process 130.

In one embodiment, financial data 134 includes line items of billing and income data including effective dates when, for example, an income amount is expected to be made available for the payment of bills, or a date when a payment associated with a particular bill or line item is due. In one embodiment, financial data 134 further includes amounts relating to each line item, i.e. a minimum payment due, a total amount due, an income amount, or any other amount deemed useful in determining payment amounts associated with bills. In one embodiment, the line items of financial data 134 are acquired through scraping of a billing entity website, such as a billing entity website provided by web server 146. In one embodiment the line items of data are acquired through optical character recognition of electronic images of one or more of invoices or other bills received from a billing entity. In one embodiment, financial data 134 includes two or more individual sets of line item data representing one or more invoices and/or other forms of bills.

Computing system 104 is, in one embodiment, primarily configured to acquire, analyze and make payments corresponding to billing data of various consumers, such as a consumer user of computing system 102. Billing data of a billing entity is, in one embodiment, acquired by computing system 104 from one or more different sources, such as financial data 134 of computing system 102. For example, in one embodiment, a consumer user of computing system 102 utilizes web browser 128 of computing system 102, to become authenticated with a website provided by web server 146.

In one embodiment, a consumer user of computing system 102 interacts through web browser 128 with a website of web server 146 developed using one or more of web page data 148, and user-specific data 152.

In one embodiment, computing system 106 is operated by, or on behalf of, or otherwise under the control of a financial institution from which at least a portion of financial data 134 is received. In one embodiment, computing system 106 is operated by, or on behalf of, or otherwise under the control of a billing entity from which at least a portion of financial data 134 is received.

In one embodiment, the website of web server 146 requires that the consumer user of computing system 102 be authenticated as an authorized user of the website of web server 146 prior to presenting a user-specific web page to the consumer user of computing system 102. In one embodiment, login data 132 of computing system 102 includes at least a portion of login data of the user of computing system 102, which is compared with at least a portion of website authorization data 150 of computing system 106. If a match exists between at least a portion of login data 132 and at least a portion of website authorization data 150, the user of computing system 102 is authenticated as an authorized user of the website of web server 146 and one or more user-specific web pages are prepared by web server 146 and presented to the user at web browser 128. In one embodiment, at least a portion of financial data 134 is then acquired through screen-scraping processes performed by computing system 102.

In one embodiment, at least a portion of financial data 134 is acquired through data transmission from computing system 106 to either or both of computing system 102 or computing system 104.

Similarly, in one embodiment, computing system 104 requires that a consumer user of computing system 102 be authenticated as an authorized user of computing system 104 prior to one or more operations of process 130 being performed on behalf of the consumer user of computing system 102. In one embodiment, login data 132 of computing system 102 includes at least a portion of login data of the user of computing system 102, which is compared with at least a portion of authorization data 142 of computing system 104. If a match exists between at least a portion of login data 132 and at least a portion of authorization data 142, the consumer user of computing system 102 is authenticated as an authorized user of computing system 104.

Financial data 134 of either or both of computing system 102 and computing system 104, may be acquired in many different ways. In one embodiment, financial data 134 is acquired by the consumer user of computing system 102 from a webpage of computing system 106, through screen scraping one or more user-specific webpages provided by web server 146 as discussed herein. In one embodiment, financial data 134 is acquired by computing system 104 logging into computing system 106 on behalf of the consumer user of computing system 102, and screen scraping one or more user-specific webpages provided by web server 146 as discussed herein. In one embodiment, financial data 134 is acquired by performing optical character recognition on one or more scanned invoices and/or other forms of bills, by the consumer user or by any other interested party.

Once the consumer user of computing system 102 is authenticated with computing system 106, web server 146 utilizes web page data 148 and user-specific data 152 to present a user-specific webpage for the consumer user of computing system 102. This user-specific webpage is then scraped for billing data, such as financial data 134.

FIG. 2 includes FIGS. 2A, 2B, 2C, and 2D and is an exemplary flowchart depicting a process for automated optimization of budgeted fund allocation to pay bills in accordance with one embodiment.

Referring to FIG. 1 and FIG. 2 together, process 130 begins with ENTER OPERATION 202 and proceeds with IDENTIFY USER AS AN AUTHORIZED USER OPERATION 204.

In one embodiment, at IDENTIFY USER AS AN AUTHORIZED USER OPERATION 204, a user, such as a consumer in control of or otherwise operating computing system 102, is authenticated by computing system 104 as an authorized user of computing system 104.

In one embodiment, computing system 104 requires that a user of computing system 102 be authenticated as an authorized user of computing system 104 prior to one or more additional operations of process 130 being performed on behalf of the user of computing system 102. In one embodiment, login data 132 of computing system 102 includes at least a portion of login data of the user of computing system 102, which is compared with at least a portion of authorization data 142 of computing system 104. If a match exists between at least a portion of login data 132 and at least a portion of authorization data 142, the user of computing system 102 is authenticated as an authorized user of computing system 104.

In one embodiment, at IDENTIFY USER AS AN AUTHORIZED USER OPERATION 204, a user, such as a consumer in control of or otherwise operating computing system 102, is authenticated by computing system 106 as an authorized user of computing system 106.

In one embodiment, the website of web server 146 of computing system 106 requires that the user of computing system 102 be authenticated as an authorized user of the website of web server 146 prior to web server 146 presenting a user-specific web page to the user of computing system 102. In one embodiment, login data 132 of computing system 102 includes at least a portion of login data of the user of computing system 102, which is compared with at least a portion of website authorization data 150 of computing system 106. If a match exists between at least a portion of login data 132 and at least a portion of website authorization data 150, the user of computing system 102 is authenticated as an authorized user of the website of web server 146 and one or more user-specific web pages are prepared by web server 146 and presented to the user at web browser 128.

In one embodiment, following authentication of a user at IDENTIFY USER AS AN AUTHORIZED USER OPERATION 204, process flow proceeds with RECEIVE FINANCIAL DATA INCLUDING BILLS OF A CONSUMER FOR A GIVEN BILLING PERIOD; INITIALIZE VARIABLES OPERATION 206.

In one embodiment, at RECEIVE FINANCIAL DATA INCLUDING BILLS OF A CONSUMER FOR A GIVEN BILLING PERIOD; INITIALIZE VARIABLES OPERATION 206, at least a portion of financial data 134 is acquired by either of computing system 102 or computing system 106. In one embodiment, at RECEIVE FINANCIAL DATA INCLUDING BILLS OF A CONSUMER FOR A GIVEN BILLING PERIOD; INITIALIZE VARIABLES OPERATION 206, at least a portion of financial data 134 is received at computing system 104 from computing system 102. In one embodiment, at RECEIVE FINANCIAL DATA INCLUDING BILLS OF A CONSUMER FOR A GIVEN BILLING PERIOD; INITIALIZE VARIABLES OPERATION 206, at least a portion of financial data 134 is received at computing system 102 through user input received at web browser 128. The received user input is subsequently provided by computing system 102 to computing system 104.

In one embodiment, at RECEIVE FINANCIAL DATA INCLUDING BILLS OF A CONSUMER FOR A GIVEN BILLING PERIOD; INITIALIZE VARIABLES OPERATION 206, at least a portion of financial data 134 is received at computing system 102 through screen scraping of one or more user-specific web pages of a website provided by web server 146 responsive to a user of computing system 102 being authenticated as an authorized user of computing system 106. In one embodiment, computing system 106 is a computing system being operated by, or is otherwise under the control of a billing entity, such as a credit card company, a utility company, or any other billing entity as described herein.

In one embodiment, the received financial data includes initial running balance amount data, the initial running balance amount data including an initial running balance amount indicating how much money is budgeted or otherwise currently available for making payments.

In one embodiment, the initial running balance amount is an amount expected to be available on a given income date or other date for making payments. In one embodiment, the initial running balance amount is an actual balance amount associated with a designated financial institution account. In one embodiment, the initial running balance amount is a sum of two or more actual and/or hypothetical balance amounts associated with two or more respective financial institution accounts having funds that are currently or will later be made available for making payments. In one embodiment, the initial running balance amount is below zero, representing a negative amount budgeted or available on a given date.

In one embodiment, computing system 106 is a computing system being operated by, or is otherwise under the control of a financial institution, such as a bank, credit union, stock brokerage, or any other kind of financial institution. In one embodiment, a financial institution controlling and/or operating computing system 106 receives income and/or billing data from other sources of data, such as an employer of the user of computing system 102, a billing entity, or any other source of data able to provide income or billing data to the financial institution. In this example, where a financial institution controls and/or operates computing system 106, financial data 134 includes a combination of income and billing data which is presented in a user-specific website provided by web server 146 and accessible to a properly authenticated user of computing system 102 or to computing system 104 after computing system 104 is authenticated with computing system 106 on behalf of a user of computing system 102.

In one embodiment, screen scraping of one or more user-specific webpages of a website provided by web server 146 is accomplished at computing system 104, on behalf of a user of computing system 102. In one embodiment, at least a portion of login data 132 which includes credentials of the user of computing system 102 which are needed to authenticate the user of computing system 102 as an authorized user of computing system 106 are provided to computing system 104 so that computing system 104 may use a virtual browser (not shown) or other means in order to log into a website provided by web server 146, on behalf of the user of computing system 102.

In one embodiment, once the appropriate credentials of the user of computing system 102 are provided to computing system 104, computing system 104 may subsequently use those credentials to become authenticated with computing system 106 at any time on behalf of the user of computing system 102 without needing further intervention by the user of computing system 102, thus allowing process 130 to proceed automatically at any time.

In one embodiment, at RECEIVE FINANCIAL DATA INCLUDING BILLS OF A CONSUMER FOR A GIVEN BILLING PERIOD; INITIALIZE VARIABLES OPERATION 206, one or more variables which will be used in process 130 are initialized. In one embodiment, initialized variables include one or more of a running balance variable, a minimum balance variable, one or more holdback amounts, a total of minimum payments variable, and an extra amount available variable. In practical application, in one embodiment, a value associated with the running balance variable represents how much money is left for paying bills at any given moment, whether simulating a first pass through each line item, or when performing a second pass through each line item and actually paying bills. In practical application, in one embodiment, a value associated with the minimum balance variable represents a minimum value ever achieved by the running balance variable during a first pass through each line item as described herein.

In practical application, in one embodiment, the respective values of each of the one or more holdback amounts each include a total amount that will be held back from the total amount available for a given time period associated with the holdback amount where the total amount held back is equivalent to the total of the minimum payments required to be made during that given time. A value of a given holdback amount is thus set at an appropriate time by copying the value of the total of minimum payments variable when needed.

In one embodiment, prior to processing any of the line items, all holdback amounts are either initialized at zero or are otherwise set to null. In one embodiment, the holdback amounts don't exist until needed, and are created in real-time by process 130. In one embodiment, a running balance variable is initially set to an initial value representing an amount available for making payments, as described above. In one embodiment, a minimum balance variable is initially set to the value of the running balance variable and adjusted by process 130 as needed. In one embodiment, the extra amount available variable doesn't exist until needed, and is created in real-time by process 130. In one embodiment, the extra amount available variable is created prior to any line items being processed, and is initialized to a value of zero.

In one embodiment, once at least a portion of financial data 134 is received, and one or more variables are initialized, at RECEIVE FINANCIAL DATA INCLUDING BILLS OF A CONSUMER FOR A GIVEN BILLING PERIOD; INITIALIZE VARIABLES OPERATION 206, process flow proceeds with ORDER BILLS AS LINE ITEMS ACCORDING TO DUE DATE AND MINIMUM PAYMENT DUE OPERATION 208.

In one embodiment, at ORDER BILLS AS LINE ITEMS ACCORDING TO DUE DATE AND MINIMUM PAYMENT DUE OPERATION 208, financial data 134 is organized as two or more line items of data, including one or more of income related line items and payment related line items.

In one embodiment, financial data 134 includes at least two billing-related line items representing amounts owed to at least two different billing entities. In one embodiment, the financial data includes at least one income-related line item having a real income amount previously received or an expected income amount expected to be received at a later date.

In one embodiment, each billing-related line item represents one or more typical data items a consumer would normally see on an invoice or other bill, such as one or more of a payment amount owed to the billing entity, an effective date, such as a payment due date, a minimum payment amount, billing entity contact data, and any other billing-related data typically found on an invoice or other bill.

In one embodiment, each income-related line item represents one or more typical data items associated with payments of income, such as one or more of an income amount, an effective date such as an income payment date and optional information identifying a business, person, or other source of income relating to the income related line item.

In one embodiment, at ORDER BILLS AS LINE ITEMS ACCORDING TO DUE DATE AND MINIMUM PAYMENT DUE OPERATION 208, if financial data 134 includes two or more billing-related line items of data, the two or more billing-related line items of data of financial data 134 are ordered in ascending order according to due date and a minimum payment amount. In one embodiment, the two or more billing-related line items of data of financial data 134 are ordered in ascending order according to due date and total amount owed. In one embodiment, one or more billing-related line items of data represent one or more bills where the total amount due and the minimum payment due are the same amount, such as a rent payment that is due, utility bills, television or Internet bills, insurance premiums, or any other bills where the total amount due and the minimum payment due are the same amount. In such circumstances, the minimum payment due and the total amount owed are treated as being equal, for the purposes of ordering the line items as described above.

In one embodiment, once the billing data of financial data 134 has been ordered as line items according to due date and minimum payment due at ORDER BILLS AS LINE ITEMS ACCORDING TO DUE DATE AND MINIMUM PAYMENT DUE OPERATION 208, process flow proceeds with INCORPORATE INCOME EVENTS INTO BILLING-RELATED LINE ITEMS OPERATION 210.

In one embodiment, at INCORPORATE INCOME-RELATED LINE ITEMS INTO BILLING RELATED LINE ITEMS OPERATION 210, income-related line items of financial data 134 are incorporated into the billing-related line items previously ordered at ORDER BILLS AS LINE ITEMS ACCORDING TO DUE DATE AND MINIMUM PAYMENT DUE OPERATION 208.

In one embodiment, at INCORPORATE INCOME-RELATED LINE ITEMS INTO BILLING-RELATED LINE ITEMS OPERATION 210, income related line items of financial data 134 are incorporated into the billing-related line items according to effective dates associated with those income-related line items. In one embodiment, income-related line items having a given effective date are grouped with billing-related line items having the same effective date, with the income-related line items for the given effective date being processed prior to any billing-related items having the same given effective date. In one embodiment, the collection of line items resulting from performing INCORPORATE INCOME-RELATED LINE ITEMS INTO BILLING-RELATED LINE ITEMS OPERATION 210 is a set of line items that will be processed in the first and second passes, in order to determine payment amounts to be applied to billing-related line items.

In one embodiment, once income-related line items have been incorporated into the billing-related line items, at INCORPORATE INCOME-RELATED LINE ITEMS INTO BILLING-RELATED LINE ITEMS OPERATION 210, process flow proceeds with SELECT A LINE ITEM FOR CONSIDERATION OPERATION 212, a process operation which when first performed, begins a first pass through each line item of data of the set of line items.

Table 1 below represents an example of income-related and billing-related line items and various results from a first pass, according to one embodiment. Persons of ordinary skill will readily appreciate that the income-related line item and the billing-related line items presented in Table 1 are exemplary only, and are presented to demonstrate the process operations described herein. Reference will be made to Table 1 throughout the description of the process operations of FIG. 2. The rows of Table 1 are numbered in the column to the far left, for easy reference.

Referring to Table 1, the second column, labeled "Date" represents an effective date of the particular line item, such as a due date for a payment to be made against a bill or a date and income amount is expected to be received. The third column, labeled "type" represents a line item name, which also indicates the type of debt associated with the particular line item, such as rent, which is a recurring debt where the minimum required payment and the total payment owed are the same, or credit card, which is a recurring debt where the minimum required payment is typically much less than the total payment owed, and one or more income-related line items representing income being received. The column labeled "min payment" represents various amounts that are the minimum payments allowed for each individual line item. The column labeled "total owed" represents a total amount that is currently owed with respect to the particular line item, such as a total credit card amount owed, the amount of a rent payment, the current amount of utility bill, or any other total amount owed. The running balance column represents how much money is left after paying the minimum amount against the particular line item. The total minimum payments column represents a total of minimum payments for revolving credit lines incurred since the last income event. The possible holdback amounts column represents an amount of money that needs to be held back from nonrecurring credit line payments in order to be able to make minimum payments against each revolving credit line. In the example of Table 1, the amount of money initially made available for paying bills is $1000.

TABLE 1

| | Date | Type | min payment | total owed | running balance | total minimum payments | possible holdback amounts |
|---|---|---|---|---|---|---|---|
| 1 | 1-Jan | rent | 800 | 800 | 200 | 0 | 0 |
| 2 | 2-Jan | CC1 | 50 | 1000 | 150 | 50 | 0 |
| 3 | 2-Jan | CC2 | 140 | 500 | 10 | 190 | 0 |
| 4 | 4-Jan | CC3 | 100 | 1000 | −90 | 290 | 290 |
| 5 | 5-Jan | CC4 | 20 | 500 | −110 | 310 | 310 |
| 6 | 6-Jan | income | 300 | | 190 | 0 | 0 |
| 7 | 7-Jan | CC5 | 32 | 100 | 158 | 32 | 0 |
| 8 | 8-Jan | ATT | 200 | 200 | −42 | 32 | 32 |
| 9 | 9-Jan | CC6 | 10 | 100 | −52 | 42 | 42 |
| 10 | 10-Jan | CC7 | 30 | 100 | −82 | 72 | 72 |

In one embodiment, at SELECT A LINE ITEM FOR CONSIDERATION OPERATION 212, a financial data line item is selected for consideration, such as a line item from the set of line items previously ordered at ORDER BILLS AS LINE ITEMS ACCORDING TO DUE DATE AND MINIMUM PAYMENT DUE OPERATION 208 and resulting from INCORPORATE INCOME-RELATED LINE ITEMS INTO BILLING-RELATED LINE ITEMS OPERATION 210.

In one embodiment, the line item selected at SELECT A LINE ITEM FOR CONSIDERATION OPERATION 212, is an income-related line item or a billing-related line item having the earliest effective date of all line items of the set of line items that have not yet been processed in this first pass. In one embodiment, at SELECT A LINE ITEM FOR CONSIDERATION OPERATION 212, if process 130 is just beginning to analyze the line items of Table 1, for example, the first selected line item will be line item 1, which is the same line item having the earliest effective date. In a second example, and in one embodiment, at SELECT A LINE ITEM FOR CONSIDERATION OPERATION 212, if process 130 has already evaluated line items one through five of Table 1, for example, the selected line item will be line item 6, which is the next line item not previously evaluated that has the earliest effective date.

In one embodiment, once a line item has been selected from the set of line items at SELECT A LINE ITEM FOR CONSIDERATION OPERATION 212, process flow proceeds with IS THE SELECTED LINE ITEM AN INCOME-RELATED LINE ITEM? OPERATION 214.

In one embodiment, at IS THE SELECTED LINE ITEM AN INCOME-RELATED LINE ITEM? OPERATION 214, a determination is made as to whether the line items selected at SELECT A LINE ITEM FOR CONSIDERATION OPERATION 212 is an income-related line item, or is instead a payment-related line item. In the example of selecting line item 6 for evaluation and processing, line item 6 would be determined to be an income-related line item, resulting in affirmative response at IS THE SELECTED LINE ITEM AN INCOME-RELATED LINE ITEM? OPERATION 214, If, at IS THE SELECTED LINE ITEM AN INCOME-RELATED LINE ITEM? OPERATION 214, a determination is made that the selected line item is an income-related line item, process flow proceeds with SAVE CURRENT VALUES OF VARIABLES AND LINE ITEM DATE FOR LATER USE OPERATION 216.

Recall that the minimum balance variable represents a minimum value ever achieved by the running balance variable during a first pass through each line item as described herein. In the example of Table 1, and looking at the running balance column for all running balance values prior to the income of line item 6 being received, the minimum running balance is $−110, representing a deficit of funds to pay bills. In one embodiment, the minimum balance variable tracks the minimum running balance available between income-related line items. Therefore, the minimum balance variable at the end of processing line item 5 would be the value of the running balance variable which is $−110. In one embodiment, at SAVE CURRENT VALUES OF VARIABLES AND LINE ITEM DATE FOR LATER USE OPERATION 216, the value of the minimum balance variable, i.e. $−110 is saved together with the line item date where the minimum balance occurred, i.e. January 5. Since there was no prior income-related line item in the line items of Table 1, the minimum balance variable value of $−110 applies for each line item prior to the income-related line item 6.

In one embodiment, at SAVE CURRENT VALUES OF VARIABLES AND LINE ITEM DATE FOR LATER USE OPERATION 216, the value of the total of minimum payments variable and/or the value of the current holdback amount is saved as a holdback amount, to be used later with the date of the line item immediately preceding the income related line item where the total of minimum payments variable was last affected.

In one embodiment, once the current value of the minimum balance variable and the associated line item date have been saved for later use at SAVE CURRENT VALUES OF VARIABLES AND LINE ITEM DATE FOR LATER USE OPERATION 216, process flow proceeds with ADD INCOME AMOUNT TO RUNNING BALANCE OPERATION 218. As can be seen in the example of Table 1 the running balance after line item 5 has been evaluated and processed is $-110. After the income amounts of line item 6, i.e. $300 is added, the running balance after line item 6 has been evaluated and processed is $190.

Following completion of ADD INCOME AMOUNT TO RUNNING BALANCE OPERATION 218, process flow proceeds with SET TOTAL OF MINIMUM PAYMENTS VARIABLE TO ZERO OPERATION 220.

In the discussion that follows with payment-related line items, the total of minimum payments variable tracks a sum of all minimum payments required for revolving credit-related line items processed between income-related line items. For example, line item one of Table 1 represents rent, a fixed amount due each month, so it's minimum payment is not added to the value of the total of minimum payments variable. However, line items 2 through 5 of Table 1 represent credit cards, i.e. revolving payment accounts, and minimum payments required for line items two through five are added to the total of minimum payments variable as those line items are processed.

Following completion of SET TOTAL OF MINIMUM PAYMENTS VARIABLE TO ZERO OPERATION 220, process flow proceeds with SET CURRENT HOLDBACK AMOUNT TO ZERO OPERATION 222.

In one embodiment, at SET CURRENT HOLDBACK AMOUNT TO ZERO OPERATION 222, since an income-related line item is being processed, a current holdback amount variable is set to zero, in order to begin a new period where a new potential holdback amount will apply.

In one embodiment, once the current holdback amount is set to zero at SET CURRENT HOLDBACK AMOUNT TO ZERO OPERATION 222, process flow proceeds with ARE THERE MORE LINE ITEMS TO PROCESS? OPERATION 224.

In one embodiment, at ARE THERE MORE LINE ITEMS TO PROCESS? OPERATION 224, a determination is made as to whether all currently available line items have been evaluated and processed. If, at ARE THERE MORE LINE ITEMS TO PROCESS? OPERATION 224, a determination is made that not all currently available line items have been processed, process flow proceeds again with SELECT A LINE ITEM FOR CONSIDERATION OPERATION 212 as described above.

In one embodiment, if, at ARE THERE MORE LINE ITEMS TO PROCESS OPERATION 224, a determination is made that all line items have been evaluated and processed in a first pass, process flow proceeds with process operations included in a second pass, which will be described below. It is intended herein to describe the first pass completely before proceeding with description of process operations involved with the second pass in order to provide the most clarity.

If, at IS THE SELECTED LINE ITEM AN INCOME-RELATED LINE ITEM? OPERATION 214, a determination is made that the selected line item is not an income-related line item, process flow proceeds with SUBTRACT A MINIMUM PAYMENT AMOUNT FOR THE SELECTED LINE ITEM FROM THE PREVIOUS MINIMUM BALANCE AMOUNT RESULTING IN A NEW MINIMUM BALANCE AMOUNT OPERATION 226.

In one embodiment, at SUBTRACT A MINIMUM PAYMENT AMOUNT FOR THE SELECTED LINE ITEM FROM THE PREVIOUS MINIMUM BALANCE AMOUNT RESULTING IN A NEW MINIMUM BALANCE AMOUNT OPERATION 226 the currently selected line item is simulated as being paid at the minimum payment amount, thus reducing the running balance by the amount of the minimum payment required for the particular selected line item. Using the example of the currently selected line item being line item 2 of Table 1, the previous running balance resulting from processing line item 1 of Table 1 was $200. In this example, at SUBTRACT A MINIMUM PAYMENT AMOUNT FOR THE SELECTED LINE ITEM FROM THE PREVIOUS MINIMUM BALANCE AMOUNT RESULTING IN A NEW MINIMUM BALANCE AMOUNT OPERATION 226, the minimum payment value associated with the line item 2 is $50. Subtracting the minimum payment value for line item 2 results in the difference between $200 and $50 which is $150, as seen in the running balance for line item 2.

Similarly, using the example of the currently selected line item being line item 3 of Table 1, the previous running balance resulting from processing line item 2 of Table 1 was $150. In this example, at SUBTRACT A MINIMUM PAYMENT AMOUNT FOR THE SELECTED LINE ITEM FROM THE PREVIOUS MINIMUM BALANCE AMOUNT RESULTING IN A NEW MINIMUM BALANCE AMOUNT OPERATION 226, the minimum payment value associated with the line item 3 is $140. Subtracting the minimum payment value for line item 3 results in the difference between $150 and $140 which is $10, as seen in the running balance for line item 3.

In one embodiment, once a new running balance amount is determined at SUBTRACT A MINIMUM PAYMENT AMOUNT FOR THE SELECTED LINE ITEM FROM THE PREVIOUS MINIMUM BALANCE AMOUNT RESULTING IN A NEW MINIMUM BALANCE AMOUNT OPERATION 226, process flow proceeds with ADD LINE ITEM AMOUNT TO TOTAL OF MINIMUM PAYMENTS AMOUNT OPERATION 228.

Using the example of the currently selected line item being line item 2 of Table 1, the previous total of minimum payments amount resulting from processing line item 1 of Table 1 was $0, since the total of minimum payments amount represents only revolving credit accounts. In this example, at ADD LINE ITEM AMOUNT TO TOTAL OF MINIMUM PAYMENTS AMOUNT OPERATION 228, the minimum payment value associated with the line item 2 is $50. Therefore, since the total of minimum payments amount resulting from processing line item 1 was $0, and the currently selected line item has a minimum payment amount of $50, the total of the two numbers is $50, and is reflected as the total of minimum payments amount for line item 2.

Recall that when an income-related line item is selected, the previous total of minimum payment amounts variable is reset to zero. Therefore, after processing line item 7 of Table 1, the total of minimum payments variable equals $32, because the total of minimum payments variable was reset to zero during the processing of line item 6, an income-related line item.

As previously described, the total of minimum payments amount tracks the total amount paid against minimum payments for revolving credit accounts, such as credit cards and other revolving credit accounts. Therefore, in one embodiment, ADD LINE ITEM AMOUNT TO TOTAL OF MINIMUM PAYMENTS AMOUNT OPERATION 228 is only performed if the selected line item involves a revolving credit account.

Once the total of minimum payments amount is updated at ADD LINE ITEM AMOUNT TO TOTAL OF MINIMUM PAYMENTS AMOUNT OPERATION 228, process flow proceeds with IS THE RUNNING BALANCE AMOUNT BELOW ZERO? OPERATION 230.

In one embodiment, if, at IS THE RUNNING BALANCE AMOUNT BELOW ZERO? OPERATION 230, a determination is made that the running balance amount is below zero, meaning that there are no funds left with which to make payments, process flow proceeds with SET CURRENT HOLDBACK AMOUNT TO THE VALUE OF THE TOTAL OF MINIMUM PAYMENTS AMOUNT OPERATION 232.

In one embodiment, at SET CURRENT HOLDBACK AMOUNT TO THE VALUE OF THE TOTAL OF MINIMUM PAYMENTS AMOUNT OPERATION 232, there are not enough funds presently available to pay minimum payments on all bills requiring minimum payments, and holdback amounts are therefore being determined which are used when paying monthly bills that do not involve revolving credit accounts. Using the example of line item 4 of Table 1, the running balance is negative, reflecting that there are not enough funds to pay the minimum amount on the bill represented by line item 4, necessitating a holdback amount of $290, the then present total value of minimum payments for previously evaluated and processed line items. Thus, with respect to line item 4, at SET CURRENT HOLDBACK AMOUNT TO THE VALUE OF THE TOTAL OF MINIMUM PAYMENTS AMOUNT OPERATION 232, the value of the current holdback amount is $290, the same as the value of the total of minimum payments amount of line item 4.

Using the example of line item 5 of Table 1, the running balance is negative, reflecting that there are not enough funds to pay the minimum amount on the bill represented by line item 5, necessitating a holdback amount of $310, the then present total value of minimum payments for previously evaluated and processed line items. Thus, with respect to line item 5, at SET CURRENT HOLDBACK AMOUNT TO THE VALUE OF THE TOTAL OF MINIMUM PAYMENTS AMOUNT OPERATION 232, the value of the current holdback amount is set to $310, thus overwriting the previous holdback amount.

Recall that a current holdback amount is applicable to any period over which bills are paid, bounded by the deeds associated with income-related line items. Thus, the current holdback amount of $310 applies to the period of time beginning with the effective date of line item 1 and ending with the effective date of the next income-related line item, which is line item 6.

Had, for example, line item 2 been an income-related line item instead of a line item related to a revolving credit line such as a credit card, the current holdback amount determined at line item 5 would apply to dates between the effective date of line item 2, i.e. 2-January, and 6-January, the effective date of line item 6, the next income-related line item.

In one embodiment, once the current holdback amount is set to the value of the total of minimum payments amount at SET CURRENT HOLDBACK AMOUNT TO THE VALUE OF THE TOTAL OF MINIMUM PAYMENTS AMOUNT OPERATION 232, process flow proceeds with ARE THERE MORE LINE ITEMS TO PROCESS? OPERATION 224 as previously described.

In one embodiment, if, at IS THE RUNNING BALANCE AMOUNT BELOW ZERO? OPERATION 230, a determination is made that the running balance amount is not below zero, process flow proceeds with ARE THERE MORE LINE ITEMS TO PROCESS? OPERATION 224 as previously described.

The description above includes a first pass through each line item of data, and includes the determination of holdback amounts, if any, for one or more time periods, a minimum balance that would result from paying the minimum amount required by each billing-related line item, and an ending running balance which, if the running balance is above zero, is also considered extra funds available to make additional payments against one or more bills represented by the billing-related line items.

In one embodiment, following a determination, at ARE THERE MORE LINE ITEMS TO PROCESS? OPERATION 224, that all line items have been evaluated and processed in a first pass, process flow proceeds with INITIALIZE LINE ITEMS AND DATA FOR SECOND PASS OPERATION 234.

In one embodiment, at INITIALIZE LINE ITEMS AND DATA FOR SECOND PASS OPERATION 234 one or more variables are deleted as they will no longer be necessary, while others are initialized to zero. For example, in this second pass, there is no need to track a current minimum balance, so any process variables that were used to track a current minimum balance are, in one embodiment, deleted or otherwise disabled. Further, an actual payment variable may be introduced for each billing-related line item, if desired. In one embodiment, the running balance variable is reset to its original value set prior to the beginning of the first pass. Thus, the running balance is initialized to a value representing an amount of money that is available to pay bills, as described above.

In one embodiment, following the initialization of line items and data for the second pass at INITIALIZE LINE ITEMS AND DATA FOR SECOND PASS OPERATION 234, process flow proceeds with SELECT A LINE ITEM FOR CONSIDERATION OPERATION 236.

In one embodiment, the line item selected at SELECT A LINE ITEM FOR CONSIDERATION OPERATION 236, is an income-related line item or a billing-related line item having the earliest effective date of all line items of the set of line items that have not yet been processed in this first pass. In one embodiment, at SELECT A LINE ITEM FOR CONSIDERATION OPERATION 236, if process 130 is just beginning to process the line items of Table 1 in the second pass, for example, the first selected line item will be line item 1, which is the same line item having the earliest effective date. In a second example, and in one embodiment, at SELECT A LINE ITEM FOR CONSIDERATION OPERATION 236, if process 130 has already performed a second pass on line items 1 through 5 of Table 1, for example, the selected line item will be line item 6, which is the next line item not previously processed in the second pass that has the earliest effective date.

In one embodiment, once a line item has been selected from the set of line items at SELECT A LINE ITEM FOR CONSIDERATION OPERATION 236, process flow proceeds with IS THE SELECTED LINE ITEM AN INCOME-RELATED LINE ITEM? OPERATION 238.

In one embodiment, at IS THE SELECTED LINE ITEM AN INCOME-RELATED LINE ITEM? OPERATION 238, a determination is made as to whether the selected line item is income-related. If not, process flow proceeds with DOES THE SELECTED ITEM LINE ITEM REPRESENT A REVOLVING CREDIT LINE? OPERATION 240.

In one embodiment, at DOES THE SELECTED ITEM LINE ITEM REPRESENT A REVOLVING CREDIT LINE? OPERATION 240, a determination is made as to whether the selected line item represents a revolving credit line, such as a credit card or other revolving credit line. If not, an assumption is made that the selected line item represents a payment-related line item having a fixed payment every month, such as rent, a fixed bill from a utility company, an installment loan payment, or any other payment-related line item having a fixed payment every month. In one embodiment, once a determination is made at DOES THE SELECTED ITEM LINE ITEM REPRESENT A REVOLVING CREDIT LINE? OPERATION 240 that the selected line item does not represent a revolving credit line, process flow proceeds with IS MIN(AMT ON BILL, RUNNING BALANCE-HOLDBACK AMOUNT) LESS THAN ZERO? OPERATION 242.

In one embodiment, at IS MIN(AMT ON BILL, RUNNING BALANCE-HOLDBACK AMOUNT) LESS THAN ZERO? OPERATION 242, a determination is made as to whether the current running balance amount is less than the holdback amount applicable to the effective date of the currently selected line item. If the current running balance amount is less than the holdback amount applicable to the effective date of the currently selected line item, there is not enough money forecast to be available at the effective date of the currently selected line item to pay the bill associated with the currently selected line item and process flow proceeds with ADD LINE ITEM TO QUEUE TO BE PAID AT NEXT INCOME EVENT OPERATION 244.

In one embodiment, at ADD LINE ITEM TO QUEUE TO BE PAID AT NEXT INCOME EVENT OPERATION 244, a queue is created or enhanced which includes line items to be paid on or after a next income-related line item is processed. If, in one embodiment, the queue does not exist prior to the performance of ADD LINE ITEM TO QUEUE TO BE PAID AT NEXT INCOME EVENT OPERATION 244, a queue is created, and the currently selected line item is added to that queue. If, in one embodiment, the queue does exist prior to the performance of ADD LINE ITEM TO QUEUE TO BE PAID AT NEXT INCOME EVENT OPERATION 244, the queue is enhanced by adding the currently selected line item to the already existing queue.

In one embodiment, following the creation or enhancement of a queue at ADD LINE ITEM TO QUEUE TO BE PAID AT NEXT INCOME EVENT OPERATION 244, process flow proceeds with ARE THERE MORE LINE ITEMS TO PROCESS? OPERATION 246.

In one embodiment, at ARE THERE MORE LINE ITEMS TO PROCESS? OPERATION 246, a determination is made as to whether there are more line items to process in this second pass. In one embodiment, using the example of Table 1, there are a total of ten line items to process. Therefore, if the currently selected line item is not the tenth line item, the answer to the inquiry at ARE THERE MORE LINE ITEMS TO PROCESS OPERATION 246 will be yes, and process flow will proceed with SELECT A LINE ITEM FOR CONSIDERATION OPERATION 236 described earlier. If, using the example of Table 1, the currently selected line item is the tenth line item, the answer to the inquiry at ARE THERE MORE LINE ITEMS TO PROCESS? OPERATION 246 will be no, and process flow will proceed with PREPARE AND DISSEMINATE REPORT OPERATION 248.

In one embodiment, at PREPARE AND DISSEMINATE REPORT OPERATION 248, data is optionally provided by computing system 104 to computing system 102, the provided data reflecting one or more of which line items have been paid, one or more amounts that have been paid against particular ones of the line items, payment dates associated with the payments, the values of one or more process variables used during either of the first or second pass, such as the lowest minimum balance achieved, any holdback values that were used, or any other data deemed useful to computing system 102, or any other data deemed useful to a user of computing system 102.

In one embodiment, following completion of PREPARE AND DISSEMINATE REPORT OPERATION 248, process flow proceeds to EXIT OPERATION 249 where the process exits awaiting further input.

If, at IS THE SELECTED LINE ITEM AN INCOME-RELATED LINE ITEM? OPERATION 238, a determination is made that the selected line item is income-related, process flow proceeds with ADD THE INCOME AMOUNT TO THE RUNNING BALANCE AMOUNT OPERATION 250.

In one embodiment, at ADD THE INCOME AMOUNT TO THE RUNNING BALANCE AMOUNT OPERATION 250, the amount of the income-related line item is added to the current value of the running balance, thus increasing the amount of funds available to make payments.

In one embodiment, after the amount of the income-related line item is added to the current value of the running balance, at ADD THE INCOME AMOUNT TO THE RUNNING BALANCE AMOUNT OPERATION 250, process flow proceeds with ARE THERE MORE LINE ITEMS TO PROCESS? OPERATION 246 as previously described.

In one embodiment, as previously described, at DOES THE SELECTED ITEM LINE ITEM REPRESENT A REVOLVING CREDIT LINE? OPERATION 240, a determination is made as to whether the selected line item represents a revolving credit line, such as a credit card or other revolving credit line. If yes, process flow proceeds with IS MIN(MIN BAL, TOTAL OWED-MIN PAYMENT) LESS THAN ZERO? OPERATION 252. In one embodiment, if the revolving credit line is almost paid off, the total amount owed may equal the minimum required payment. If so, the inquiry of IS MIN(MIN BAL, TOTAL OWED-MIN PAYMENT) LESS THAN ZERO? OPERATION 252 reduces to a question of whether the lowest minimum balance ever achieved in the first pass is less than zero. If yes, process flow proceeds with PAY MINIMUM AMOUNT FOR THIS LINE ITEM AND AN ADDITIONAL AMOUNT UP TO HOLDBACK AMOUNT MINUS MINIMUM PAYMENT REQUIRED OPERATION 254.

In one embodiment, at PAY MINIMUM AMOUNT FOR THIS LINE ITEM AND AN ADDITIONAL AMOUNT UP TO HOLDBACK AMOUNT MINUS MINIMUM PAYMENT REQUIRED OPERATION 254, payment is made for the selected line item, where the payment is at least equal to the minimum amount required for the line item, but where also an additional amount may be paid for the selected line item up to a value that is determined by the holdback amount associated with the effective date of the currently selected line item reduced by the minimum payment amount already being paid.

In one embodiment, following payment being made for the currently selected line item at PAY MINIMUM AMOUNT FOR THIS LINE ITEM AND AN ADDITIONAL AMOUNT UP TO HOLDBACK AMOUNT MINUS MINIMUM PAYMENT REQUIRED OPERATION 254, process flow proceeds with ARE THERE MORE LINE ITEMS TO PROCESS? OPERATION 246 as previously described.

As described above, in one embodiment, at IS MIN(AMT ON BILL, RUNNING BALANCE-HOLDBACK AMOUNT) LESS THAN ZERO? OPERATION 242, a determination is made as to whether the current running balance amount is less than the holdback amount applicable to the effective date of the currently selected line item.

If the current running balance amount is greater than or equal to the holdback amount applicable to the effective date of the currently selected line item, process flow proceeds with PAY MIN(MIN AMT, RUNNING BAL-HOLDBACK AMT) OPERATION 256.

In one embodiment, at PAY MIN(MIN AMT, RUNNING BAL-HOLDBACK AMT) OPERATION 256, a payment is issued against the currently selected line item, the payment amount being equal to the minimum of either the minimum payment amount associated with the selected line item or the running balance minus a holdback amount associated with a period of time that includes the effective date of the currently selected line item.

In one embodiment, following payment of the currently selected line item at PAY MIN(MIN AMT, RUNNING BAL-HOLDBACK AMT) OPERATION 256, process flow proceeds with ARE THERE MORE LINE ITEMS TO PROCESS? OPERATION 246 as previously described.

In one embodiment, if, at IS MIN(MIN BAL, TOTAL OWED-MIN PAYMENT) LESS THAN ZERO? OPERATION 252 a determination is made that the minimum of either the lowest minimum balance achieved in the first pass or a difference of a total amount owed on the currently selected line item and a minimum required payment required for the currently selected line item payment is not less than zero, process flow proceeds with PAY MIN(MIN BAL, TOTAL OWED-MIN PAYMENT) OPERATION 258.

In one embodiment, at PAY MIN(MIN BAL, TOTAL OWED-MIN PAYMENT) OPERATION 258, a payment is made against the currently selected line item, the value of that payment being the minimum of either the lowest minimum balance achieved in the first pass or a difference of a total amount owed on the currently selected line item and a minimum required payment required for the currently selected line item payment.

In one embodiment, once a payment has been made against the currently selected line item at PAY MIN(MIN BAL, TOTAL OWED-MIN PAYMENT) OPERATION 258, process flow proceeds with SET LOWEST MIN BAL=PREVIOUS LOWEST MIN BAL-MIN(MB, TOTAL AMT OWED-MIN PAY); EX=EX-MIN(LOWEST MIN BAL, TOTAL AMT OWED-MIN PAY); OPERATION 260.

In one embodiment, at SET LOWEST MIN BAL=PREVIOUS LOWEST MIN BAL-MIN(MB, TOTAL AMT OWED-MIN PAY); EX=EX-MIN(LOWEST MIN BAL, TOTAL AMT OWED-MIN PAY); OPERATION 260, the previous lowest minimum balance achieved in the first pass is reduced by the amount of the payment made at PAY MIN(MIN BAL, TOTAL OWED-MIN PAYMENT) OPERATION 258. Further, the value of any extra amounts that were available for payment at the end of the first pass are also reduced by the amount of the payment made at PAY MIN(MIN BAL, TOTAL OWED-MIN PAYMENT) OPERATION 258.

Following completion of SET LOWEST MIN BAL=PREVIOUS LOWEST MIN BAL-MIN(MB, TOTAL AMT OWED-MIN PAY); EX=EX-MIN(LOWEST MIN BAL, TOTAL AMT OWED-MIN PAY); OPERATION 260, process flow proceeds with ARE THERE MORE LINE ITEMS TO PROCESS? OPERATION 246.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above disclosure present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automated optimization of budgeted fund allocation to pay bills comprising:
   at least one processor; and
   at least one memory coupled to the at least one processor, the at least one memory having stored therein instructions which when executed by the at least one processor, perform a process for automated optimization of budgeted fund allocation to pay bills comprising:
   providing, by a user at a user computing system, login data for at least two different billing data sources associated with the user;
   individually authenticating, using the login data associated with each billing data source, with each individual billing source, the authenticating validating the user as an authorized user of the respective billing sources;
   storing the login data within a storage area of the user computing system;
   receiving, following authentication of the user, financial data of a first time period, the first time period being a period of time encompassing a billing time period, the financial data including at least two line items representing amounts owed to the at least two different billing data sources, each line item including a balance due and a due date, the financial data further including an allocated amount from which to pay bills;
   converting the allocated amount to a running balance;
   performing, in a first pass through each line item:
     analyzing the financial data to determine whether deducting, from the running balance, a minimum amount due for each payable line item on its line item due date, and increasing the running balance by any income line item amounts on their line item due dates, will result in a running balance that is below zero at any time;
     determining, if making payments against each line item on its due date results in a running balance amount that is below zero at any time, one or more holdback amounts, the holdback amounts being amounts which allow minimum payments to be made on a first set of line items during a second time period and a second set of line items during a third time period, the second and third time periods not overlapping and being within the first time period,
     wherein the determination of a holdback amount includes:
       selecting a line item and performing:
         subtracting the minimum payment associated with the selected line item from the running balance;
         determining, after the minimum payment is subtracted from the running balance amount, that the running balance is below zero; and
         storing, in a database, responsive to determining that the running balance is below zero, a sum of minimum payments associated with payable line items selected since the most recent previous income event, further storing a date range including a beginning date of the most recent previous income event and a finish date equivalent to the date due for the selected line item;
       and wherein the system for automated optimization of budgeted fund allocation to pay bills further comprises:
         paying a deficient payment amount against at least one line item in a first time period, wherein the deficient payment amount is determined by selecting a previously determined sum of minimum payments having a date range that includes a date due of the deficient amount and subtracting that previously determined sum of minimum payments from a payment amount associated with the at least one line item; and paying, in a second pass, a first portion of an amount owed for at least one line item during the second time period and a second portion of the amount owed for the at least one line item during the third time period;

automatically authenticating, using the stored login data, with at least one of the billing data sources;

receiving, following authentication of the user, financial data of the user, the financial data including at least two line items representing amounts owed to the at least one billing data sources.

2. The system for automated optimization of budgeted fund allocation to pay bills of claim 1 further comprising:

ordering, prior to the analysis, the line items by due date and amount and wherein performing, in a first pass through each line item further comprises:

selecting, in a first pass through each line item, each line item in succession according to date due and performing the listed operations.

3. The system for automated optimization of budgeted fund allocation to pay bills of claim 1 wherein storing a sum of minimum payments associated with payable line items selected since the most recent previous income event comprises:

replacing, in a database, responsive to determining that the running balance is below zero, a prior sum of minimum payments associated with payable line items selected since the most recent previous income event with a current sum of minimum payments associated with payable line items selected since the most recent previous income event and further replacing a prior date range with a new date range, the new date range including a beginning date of the most recent previous income event and a finish date equivalent to the date due for the selected line item.

4. The system for automated optimization of budgeted fund allocation to pay bills of claim 1 wherein analyzing the financial data to determine whether making payments against each line item on its due date will result in an allocated amount that is below zero at any time further includes analyzing the financial data to determine a minimum running balance when paying each line item by the due date associated with each line item, wherein the running balance is increased for each income-related line item and decreased by at least the minimum payment amount associated with a line item.

5. The system for automated optimization of budgeted fund allocation to pay bills of claim 1 wherein paying a first portion of at least one line item during the second time period and a second portion of the at least one line item during the third time period comprises:

paying a first portion of at least one line item during the second time period and a second portion of the at least one line item during the third time period, wherein a total of amounts associated with the first and second portions equals the total amount owed on the at least one line item for the first time period.

6. The system for automated optimization of budgeted fund allocation to pay bills of claim 5, wherein the first time period is a time period of between 28 and 31 days and wherein the line items further include one or more income line items expected to occur during the first time period, the one or more income line items each including an expected income amount and an expected occurrence date.

7. The system for automated optimization of budgeted fund allocation to pay bills of claim 5 wherein at least one of the at least one line items having first and second portions paid during respective second and third time periods is a recurring payment where the amount owed for the first time period is the same as an amount owed during a time period immediately preceding the first time period.

8. The system for automated optimization of budgeted fund allocation to pay bills of claim 1 wherein paying a first portion of at least one line item during the second time period and a second portion of the at least one line item during the third time period comprises:

paying a first portion of at least one line item during the second time period and a second portion of the at least one line item during the third time period, wherein a total of amounts associated with the first and second portions is less than the total amount owed on the at least one line item for the first time period; and adding a remaining amount owed against the selected line item to a bill pay queue to be paid at a later time period.

9. The system for automated optimization of budgeted fund allocation to pay bills of claim 1 wherein paying, in a second pass, a first portion of an amount owed for at least one line item during the second time period and a second portion of the amount owed for the at least one line item during the third time period comprises:

determining a first portion by subtracting prior sum of minimum payments associated with payable line items selected since the most recent previous income event from the running balance; and determining a second portion by subtracting the first portion from an amount owed associated with the selected line item.

10. A computing system implemented process for automated optimization of budgeted fund allocation to pay bills comprising:

providing, by a user at a user computing system, login data for at least two different billing data sources associated with the user;

individually authenticating, using the login data associated with each billing data source, with each individual billing source, the authenticating validating the user as an authorized user of the respective billing sources;

storing the login data within a storage area of the user computing system;

receiving, following authentication of the user, at a financial computing system from at least two different source data computing systems, financial data of a first time period, the first time period being a limited time period less than a period of time encompassing two consecutive billing time periods, the financial data including at least two line items representing amounts owed to the at least two different billing data sources, each line item including a balance due and a due date, the financial data further including an allocated amount from which to pay bills;

converting, at the financial computing system, the allocated amount to a running balance;

performing, at the financial computing system, in a first pass through each line item:

analyzing, at the financial computing system, the financial data to determine whether deducting, from the running balance, a minimum amount due for each payable line item on its line item due date, and increasing the running balance by any income line item amounts on their line item due dates, will result in a running balance that is below zero at any time;

determining, at the financial computing system, if making payments against each line item on its due date results in a running balance amount that is below zero at any time, one or more holdback amounts, the holdback amounts being amounts which allow minimum payments to be made on a first set of line items during a second time period and a second set of line items during a third time period, the second and third time periods not overlapping and being within the first time period, wherein the determination of a holdback amount includes:

selecting a line item and performing:

subtracting the minimum payment associated with the selected line item from the running balance;

determining, after the minimum payment is subtracted from the running balance amount, that the running balance is below zero; and storing, in a database, responsive to determining that the running balance is below zero, a sum of minimum payments associated with payable line items selected since the most recent previous income event, further storing a date range including a beginning date of the most recent previous income event and a finish date equivalent to the date due for the selected line item;

and wherein the system for automated optimization of budgeted fund allocation to pay bills further comprises:

paying a deficient payment amount against at least one line item in a first time period, wherein the deficient payment amount is determined by selecting a previously determined sum of minimum payments having a date range that includes a date due of the deficient amount and subtracting that previously determined sum of minimum payments from a payment amount associated with the at least one line item; and paying, at the financial computing system, in a second pass, a first portion of an amount owed for at least one line item during the second time period and a second portion of the amount owed for the at least one line item during the third time period;

automatically authenticating, using the stored login data, with at least one of the billing data sources;

receiving, following authentication of the user, financial data of the user, the financial data including at least two line items representing amounts owed to the at least one billing data sources.

11. The computing system implemented process for automated optimization of budgeted fund allocation to pay bills of claim 10 further comprising:

ordering, at the financial computing system, prior to the analysis, the line items by due date and amount and wherein performing, at the financial computing system, in a first pass through each line item further comprises:

selecting, at the financial computing system, in a first pass through each line item, each line item in succession according to date due and performing the listed operations.

12. The computing system implemented process for automated optimization of budgeted fund allocation to pay bills of claim 10 wherein storing a sum of minimum payments associated with payable line items selected since the most recent previous income event comprises:

replacing, at the financial computing system, in a database, responsive to determining that the running balance is below zero, a prior sum of minimum payments associated with payable line items selected since the most recent previous income event with a current sum of minimum payments associated with payable line items selected since the most recent previous income event and further replacing a prior date range with a new date range, the new date range including a beginning date of the most recent previous income event and a finish date equivalent to the date due for the selected line item.

13. The computing system implemented process for automated optimization of budgeted fund allocation to pay bills of claim 10 wherein analyzing, at the financial computing system, the financial data to determine whether making payments against each line item on its due date will result in an allocated amount that is below zero at any time further includes analyzing, at the financial computing system, the financial data to determine a minimum running balance when paying each line item by the due date associated with each line item, wherein the running balance is increased for each income-related line item and decreased by at least the minimum payment amount associated with a line item.

14. The computing system implemented process for automated optimization of budgeted fund allocation to pay bills of claim 10 wherein paying a first portion of at least one line item during the second time period and a second portion of the at least one line item during the third time period comprises:

paying, at the financial computing system, a first portion of at least one line item during the second time period and a second portion of the at least one line item during the third time period, wherein a total of amounts associated with the first and second portions equals the total amount owed on the at least one line item for the first time period.

15. The computing system implemented process for automated optimization of budgeted fund allocation to pay bills of claim 14, wherein the first time period is a time period of between 28 and 31 days and wherein the line items further include one or more income line items expected to occur during the first time period, the one or more income line items each including an expected income amount and an expected occurrence date.

16. The computing system implemented process for automated optimization of budgeted fund allocation to pay bills of claim 14 wherein at least one of the at least one line items having first and second portions paid during respective second and third time periods is a recurring payment where the amount owed for the first time period is the same as an amount owed during a time period immediately preceding the first time period.

17. The computing system implemented process for automated optimization of budgeted fund allocation to pay bills of claim 10 wherein paying, at the financial computing system, a first portion of at least one line item during the second time period and a second portion of the at least one line item during the third time period comprises:

paying, at the financial computing system, a first portion of at least one line item during the second time period and a second portion of the at least one line item during the third time period, wherein a total of amounts associated with the first and second portions is less than the total amount owed on the at least one line item for the first time period; and adding, at the financial computing system, a remaining amount owed against the selected line item to a bill pay queue to be paid at a later time period.

18. The computing system implemented process for automated optimization of budgeted fund allocation to pay bills of claim 10 wherein paying, at the financial computing system, in a second pass, a first portion of an amount owed for at least one line item during the second time period and a second portion of the amount owed for the at least one line item during the third time period comprises:

determining, at the financial computing system, a first portion by subtracting prior sum of minimum payments associated with payable line items selected since the most recent previous income event from the running balance; and determining, at the financial computing system, a second portion by subtracting the first portion from an amount owed associated with the selected line item.

19. A computer program product for automated optimization of budgeted fund allocation to pay bills comprising:

a nontransitory computer readable medium, and executable program code which when loaded into memories of one or more computing systems and executed by one or more computing system processors coupled to the memories performs a process for automated optimization of budgeted fund allocation to pay bills a comprising:

providing, by a user at a user computing system, login data for at least two different billing data sources associated with the user;

individually authenticating, using the login data associated with each billing data source, with each individual billing source, the authenticating validating the user as an authorized user of the respective billing sources;

storing the login data within a storage area of the user computing system;

receiving, following authentication of the user, financial data of a first time period, the first time period being a limited time period less than a period of time encompassing two consecutive billing time periods, the financial data including at least two line items representing amounts owed to the at least two different billing data sources, each line item including a balance due and a due date, the financial data further including an allocated amount from which to pay bills;

converting the allocated amount to a running balance;

performing, in a first pass through each line item:

analyzing the financial data to determine whether deducting, from the running balance, a minimum amount due for each payable line item on its line item due date, and increasing the running balance by any income line item amounts on their line item due dates, will result in a running balance that is below zero at any time;

determining, if making payments against each line item on its due date results in a running balance amount that is below zero at any time, one or more holdback amounts, the holdback amounts being amounts which allow minimum payments to be made on a first set of line items during a second time period and a second set of line items during a third time period, the second and third time periods not overlapping and being within the first time period, wherein the determination of a holdback amount includes:

selecting a line item and performing:

subtracting the minimum payment associated with the selected line item from the running balance;

determining, after the minimum payment is subtracted from the running balance amount, that the running balance is below zero; and storing, in a database, responsive to determining that the running balance is below zero, a sum of minimum payments associated with payable line items selected since the most recent previous income event, further storing a date range including a beginning date of the most recent previous income event and a finish date equivalent to the date due for the selected line item;

and wherein the system for automated optimization of budgeted fund allocation to pay bills further comprises:

paying a deficient payment amount against at least one line item in a first time period, wherein the deficient payment amount is determined by selecting a previously determined sum of minimum payments having a date range that includes a date due of the deficient amount and subtracting that previously determined sum of minimum payments from a payment amount associated with the at least one line item; and paying, in a second pass, a first portion of an amount owed for at least one line item during the second time period and a second portion of the amount owed for the at least one line item during the third time period;

automatically authenticating, using the stored login data, with at least one of the billing data sources;

receiving, following authentication of the user, financial data of the user, the financial data including at least two line items representing amounts owed to the at least one billing data sources.

20. The computer program product for automated optimization of budgeted fund allocation to pay bills of claim 19 further comprising:

ordering, prior to the analysis, the line items by due date and amount and wherein performing, in a first pass through each line item further comprises:

selecting, in a first pass through each line item, each line item in succession according to date due and performing the listed operations.

21. The computer program product for automated optimization of budgeted fund allocation to pay bills of claim 19 wherein storing a sum of minimum payments associated with payable line items selected since the most recent previous income event comprises:

replacing, in a database, responsive to determining that the running balance is below zero, a prior sum of minimum payments associated with payable line items selected since the most recent previous income event with a current sum of minimum payments associated with payable line items selected since the most recent previous income event and further replacing a prior date range with a new date range, the new date range including a beginning date of the most recent previous income event and a finish date equivalent to the date due for the selected line item.

22. The computer program product for automated optimization of budgeted fund allocation to pay bills of claim 19 wherein analyzing the financial data to determine whether making payments against each line item on its due date will result in an allocated amount that is below zero at any time further includes analyzing the financial data to determine a minimum running balance when paying each line item by the due date associated with each line item, wherein the running balance is increased for each income-related line item and decreased by at least the minimum payment amount associated with a line item.

23. The computer program product for automated optimization of budgeted fund allocation to pay bills of claim 19 wherein paying a first portion of at least one line item during the second time period and a second portion of the at least one line item during the third time period comprises:
   paying a first portion of at least one line item during the second time period and a second portion of the at least one line item during the third time period, wherein a total of amounts associated with the first and second portions equals the total amount owed on the at least one line item for the first time period.

24. The computer program product for automated optimization of budgeted fund allocation to pay bills of claim 23, wherein the first time period is a time period of between 28 and 31 days and wherein the line items further include one or more income line items expected to occur during the first time period, the one or more income line items each including an expected income amount and an expected occurrence date.

25. The computer program product for automated optimization of budgeted fund allocation to pay bills of claim 23 wherein at least one of the at least one line items having first and second portions paid during respective second and third time periods is a recurring payment where the amount owed for the first time period is the same as an amount owed during a time period immediately preceding the first time period.

26. The computer program product for automated optimization of budgeted fund allocation to pay bills of claim 19 wherein paying a first portion of at least one line item during the second time period and a second portion of the at least one line item during the third time period comprises:
   paying a first portion of at least one line item during the second time period and a second portion of the at least one line item during the third time period, wherein a total of amounts associated with the first and second portions is less than the total amount owed on the at least one line item for the first time period; and
   adding a remaining amount owed against the selected line item to a bill pay queue to be paid at a later time period.

27. The computer program product for automated optimization of budgeted fund allocation to pay bills of claim 19 wherein paying, in a second pass, a first portion of an amount owed for at least one line item during the second time period and a second portion of the amount owed for the at least one line item during the third time period comprises:
   determining a first portion by subtracting prior sum of minimum payments associated with payable line items selected since the most recent previous income event from the running balance; and
   determining a second portion by subtracting the first portion from an amount owed associated with the selected line item.

* * * * *